Jan. 16, 1968     T. L. JERNIGAN ETAL     3,363,586
METHOD AND APPARATUS FOR PRODUCING DECORATED CONFECTIONS
Original Filed Feb. 21, 1963     2 Sheets-Sheet 1
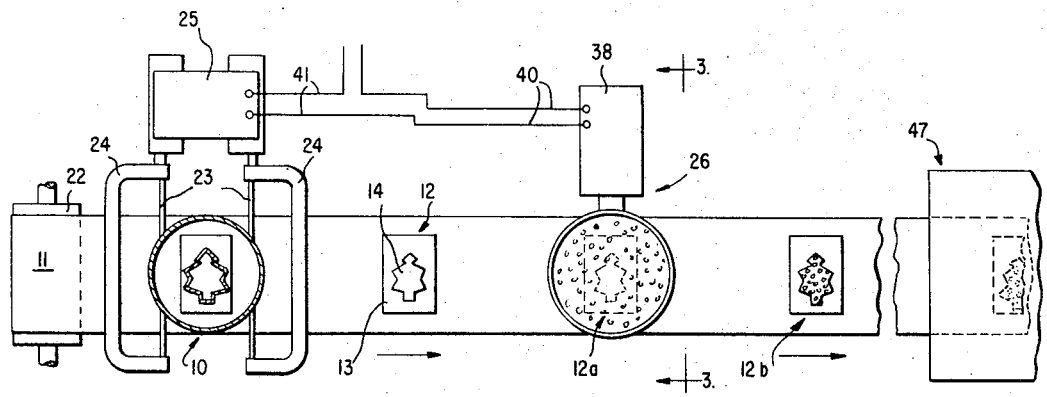
FIG.1
FIG.3
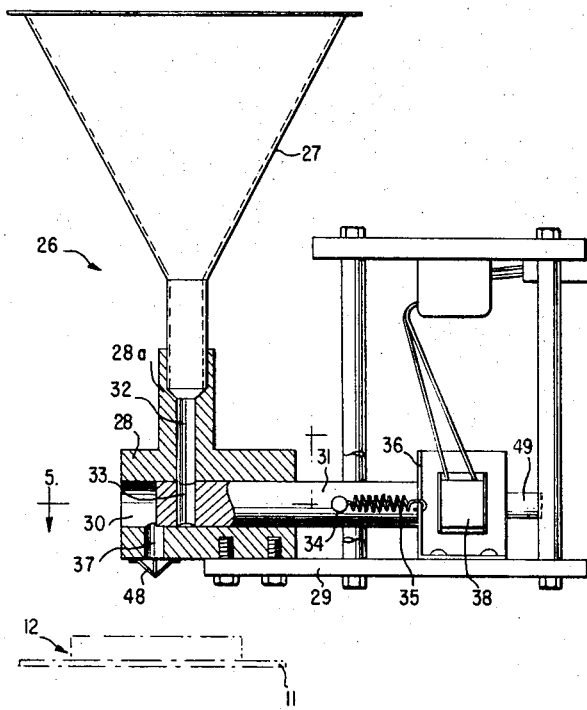
FIG.4
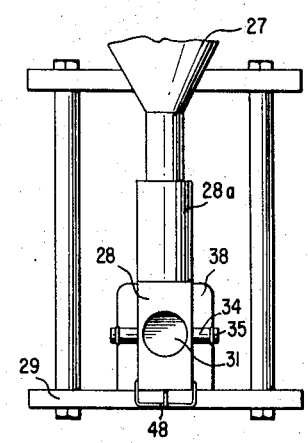
INVENTORS
THOMAS L. JERNIGAN
LESTER J. FOX
RONALD E. MINOR
BY Browne, Schuyler & Beveridge
ATTORNEYS Jan. 16, 1968    T. L. JERNIGAN ETAL    3,363,586
METHOD AND APPARATUS FOR PRODUCING DECORATED CONFECTIONS
Original Filed Feb. 21, 1963    2 Sheets-Sheet 2

INVENTORS
THOMAS L. JERNIGAN
LESTER J. FOX
RONALD E. MINOR
BY Browne, Schuyler + Beveridge
ATTORNEYS

United States Patent Office 3,363,586
Patented Jan. 16, 1968

3,363,586
METHOD AND APPARATUS FOR PRODUCING DECORATED CONFECTIONS
Thomas L. Jernigan, Richmond, Lester J. Fox, Glen Allen, and Ronald E. Minor, Richmond, Va., assignors to Eskimo Pie Corporation, Richmond, Va., a corporation of Delaware
Original application Feb. 21, 1963, Ser. No. 260,261, now Patent No. 3,257,041, dated June 21, 1966. Divided and this application Aug. 13, 1965, Ser. No. 493,293
8 Claims. (Cl. 107—1)

ABSTRACT OF THE DISCLOSURE

This invention relates to a method and apparatus for producing decorated bars of confection. The confection mix in a plastic, shape retaining condition is extruded from an orifice as an extruded length from which portions are periodically severed to form shaped bars which are moved away from the orifice at a predetermined velocity and measured amounts of edible decorative particles are dropped onto the moving bars in timed relationship to the severing step, after which the decorated bars are solidified to a hardened condition. The apparatus involves a pressurized source of confectionary mix in a plastic, shape retaining condition connected to a downwardly facing extruded nozzle located above a super cooled conveyer with a transversely moving cutter located immediately below the extruder nozzle and a source of edible particles is located over the conveyer spaced from the extruder nozzle with a fixed amount of the particles being isolated periodically in the source and release to fall on the bars on the conveyor in timed relation to each transverse movement of the cutter in severing a shaped bar from the lengths of mix emerging from the extruder nozzle.

---

This is a division of application Ser. No. 260,661 filed Feb. 21, 1963, now U.S. Patent No. 3,257,041.

This invention relates to a method and apparatus for producing decorated confections. It has a particular application to the continuous production of ice-cream bars having predetermined patterns of edible, decorative particles bonded to a surface.

For certain special occasions and as a matter of general sales appeal it is desirable to produce confections, such as bars of frozen dessert (ice-cream and the like), on which edible particles are arranged in decorative patterns on their surfaces. However, the placement of the decorative particles on the surface of the confection must be carefully controlled in order to obtain the desired decorative effect. This is particularly important in certain types of decorated bars, such as the one illustrated in FIG. 1. This particular confection comprises an ice-cream bar having a central inlay in a form of a Christmas tree with the tree being encrusted with an evenly distributed pattern of multi-colored candy particles which simulate decorations. Obviously, the decorative particles must be dispensed in a manner as to be deposited in an even pattern onto each bar so that the particles will cover only the area of the Christmas tree. If the particles are not deposited directly onto the tree, but to one side, the decorative effect will be largely lost.

Since ice-cream bars and other similar confections are produced by mass production in large volume, the accurate placement of the decorative particles by simple, inexpensive, automatic measures offer certain problems. Even in situations where the placement of the decorative particles is not too exacting, a reasonable control over placement of the particles is important. The bars of ice-cream, which are formed in accordance with various well known methods, are usualy carried on conveyer belts during their processing operation, including the application of any decorative particles. If the decorative particles are indiscriminately dispensed on top of the line of confections carried by the conveyer belt, not only is the decorative material wasted, but the particles fall onto the conveyor belt which carries the particles to other areas of the apparatus and causes undesirable contamination. The application of decorative particles by hand is too expensive, hence a highly reliable but simple automatic dispensing unit which will be essentially as accurate as hand methods must be utilized if production costs are to be mastered within reasonable limits.

A further problem exists in bonding the particles to the confection once they are applied in the desired pattern. Frozen desserts, such as ice-cream, must be maintained in a hard and frozen condition so they will retain their shape and be edible. It is usually not desirable to apply any sticky material to the surface of the ice-cream bar as a bonding medium for the particles, since this would detract from the attractiveness of the confection and also add to the cost of producing the confection. However, some acceptable and inexpensive manner of bonding the decorative particles to the bar is essential.

Dispensing units for measuring specified amounts of pulverulent matter, such as candy particles are well known. However, in preparing food products for public consumption the design of the equipment must meet rigid standards imposed by the authorities responsible for public health. All devices with which food comes in contact must be designed so that the device can be completely disassembled and thoroughly cleaned. All parts of the device which contact food, upon being disassembled, must be readily scrubbed by cleaning equipment in common use. There must be no pockets, crevices, or deadend areas in the device where food may accumulate. In other words, all internal food contacting surfaces must be even and any passages should be straight and be accessible from both ends of the passage.

An object of this invention is to provide a method and apparatus for applying edible, decorative particles onto preselected areas of confections.

Another object is to provide a method for bonding edible, decorative particles to closely define surface areas of confections.

A further object is to provide a method and apparatus for continuously producing frozen confections having edible, decorative particles bonded to identical, closely defined surface areas.

Yet another object is to provide a method and apparatus for continuously producing frozen confections having separate, inlaid areas of different types of confections to the surface of which edible particles are bonded in preselected areas.

Yet still a further object is to provide an apparatus for dispensing edible particles all of whose parts in contact with edible matter may be readily contacted with brushes and scrubbing equipment.

The objectives have been achieved by designing a special dispensing unit and adapting the extrusion process of making ice-cream bars to the use of the dispensing unit. The extrusion process adapted to this new method is generally similar to that described in U.S. Patent 2,739,545. Thus, individual bars of ice-cream are formed by continuously extruding a semifrozen mix of the ice-cream, which is sufficiently plastic to flow but will retain any shape into which formed for a moderate period, through a nozzle having a throat conforming to the desired outline shape of the bar and periodically moving cutters across the nozzle opening to sever the extruded mass into bars of equal thickness. The severed bars of plastic ice-cream mix fall onto a supercooled conveying surface (about minus 30° F.), which passes directly below the nozzle, and are transported away from the nozzle with the lower portion of the bar being congealed by the very cold conveying surface so the bar retains its shape and does not stick to the conveyer belt. The dispensing unit is located above the conveyer belt a short distance from the nozzle and a measured amount of decorative particles is released from the dispenser in a timed relationship to each actuation of the cutter. By establishing the proper relationship between conveyer velocity and spacing between the nozzle and conveyer, if the release of particles from the dispenser is triggered by each actuation of the cutter, the falling released particles will drop into identical areas of successive bars as they pass by on the conveyer belt. Since the top of the ice-cream is still in a semi-soft and plastic state, the particles will become partially embedded in the top of the bars. The subsequent refrigeration of the entire bar to a fully hardened condition will cause the decorative particles to become firmly bonded to the top of the bar. Ice-cream bars may be formed having various shaped inlays of different colors or flavors by having one or more nozzles concentrically arranged within the outer nozzle and feeding different mixes to each of the nozzles.

The invention will be described in detail with reference to the following drawings in which:

FIG. 1 is a schematic plan view of the apparatus for producing these decorated confections;

FIG. 3 is a side elevation, partly in section, of the dispensing unit in the re-charging position;

FIG. 4 is a partial end view of the dispenser in FIG. 3 as seen from the left side of that figure;

Figure 2:
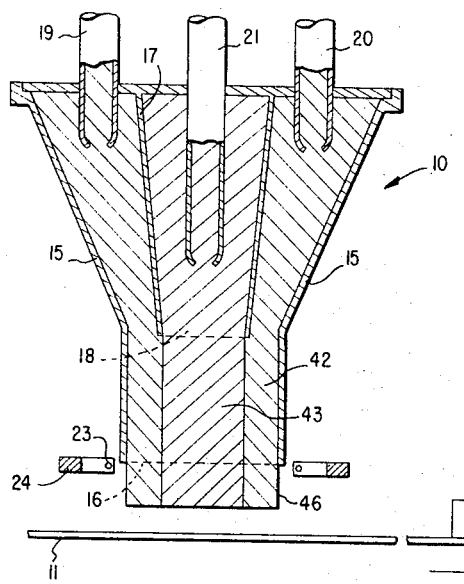
FIG. 2 is a side elevation, partly in section of the apparatus of FIG. 1.

FIGS. 1 and 2 indicate the schematic arrangement of apparatus which is utilized to produce the decorated confections in accordance with the concept of this invention. A tapered extrusion nozzle 10, which can either be in the form of a single chamber or a multi-chamber arrangement as illustrated in FIG. 2, overlies the conveyer belt 11 which is being driven by the driving roller 22 of a predetermined and constant velocity in a direction of the arrows by a power source which is not illustrated. The conveyer belt 11 is preferably made of metal and is super-cooled (approximately minus 30° F.) in a manner generally similar to that described in U.S. Patent 2,739,545.

In FIG. 2, a two chamber extrusion nozzle is illustrated which produces ice-cream bars 12 in which an inlay 14 of some decorative nature, such as the Christmas tree outline, is contained within the outer portion 14. The extrusion nozzle assembly 10 comprises a tapered outer chamber 15 having a lower throat opening 16 which conforms to the perimeter outline of the frozen confection 12. Concentrically within the outer chamber 15 is an inner nozzle chamber 17 in which the cross-sectional area at the throat section conforms to that of the inlay section 14 of the bar, such as the Christmas tree outline in FIG. 1. The throat opening 18 of the inner nozzle chamber 17 is located slightly above the exit 16 of the outer chamber but within the neck area of the throat of the outer chamber 15. Feed tubes 19, 20 and 21 extend into the top portion of each of the extrusion nozzle chambers, the outer chamber feed tubes 19 and 20 being connected to one source of frozen mix and the inner chamber feed tube 21 being connected to a separate source of frozen mix. The two mixes utilized are of different colors so the outline shape of the inlay area is readily discernible.

A device to sever material emerging from the lower end 16 of the extruder nozzle is illustrated schematically in FIG. 1. This device utilizes two parallel cutting wires arranged in a horizontal plane immediately below the lower opening 16 of the extruder nozzle 23 and connected at the ends to a pair of movable support arms 24 which are actuated by the solenoid 25 to move in a horizontal plane transversely across the bottom opening 16 of the extruder nozzle. The cutting wires 23 may have a connection to a source of electrical power (not illustrated) so that each cutting wire 23 is maintained at an elevated temperature and improve the cutting efficiency. The arrangement of the extruder nozzle and cutting wires may be generally similar to that described in considerably more detail in copending U.S. application No. 192,505 filed on Mar. 4, 1962, by Christian K. Nelson and Charles W. Melton and assigned to the same assignee as this application.

A dispenser unit 26 is positioned a pre-determined distance from the extrusion nozzle 22 vertically above the conveyer belt 11. The dispenser includes an open top funnel shaped storage bin 27 mounted in the upper extension 28a at the top of a unitary dispensing block 28 (see FIG. 3). The dispensing block 28 is bolted to a supporting frame 29 and overlies the path of the conveyer belt 11. The dispensing block 28 has a horizontal bore 30 extending through the block from its front to rear faces. A vertical passage 32 in the upper extension 28a of the dispenser block extends from the lower open end of the storage bin 27 to the top of the horizontal bore 30 on its centerline. The lower, front portion of the dispenser block 28 has a vertical passage 37 of substantially the same diameter as the upper passage 32 which extends from the bottom centerline of the bore 30 through the lower surface of the block and is offset toward the front face of the block from the upwardly extending vertical passage 32 in the top of the block so the two vertical passages do not overlap. A plunger 31 of low friction plastic closely fits within the bore 30 and is reciprocable lengthwise of the bore with one end extending beyond the rear face of the block. Near the forward end of the plunger 31 a hole 33 of a diameter substantially of the same diameter as the vertical passage 32 extends transversely through the center of the plunger.

Figure 5:
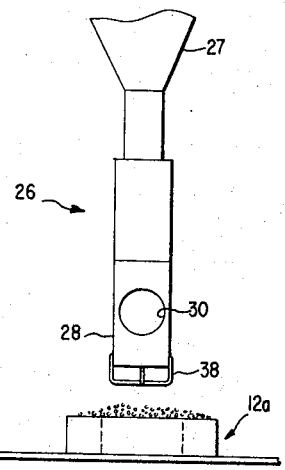
FIG. 5 is a horizontal section taken along lines 4—4 of FIG. 3.
Figure 5:
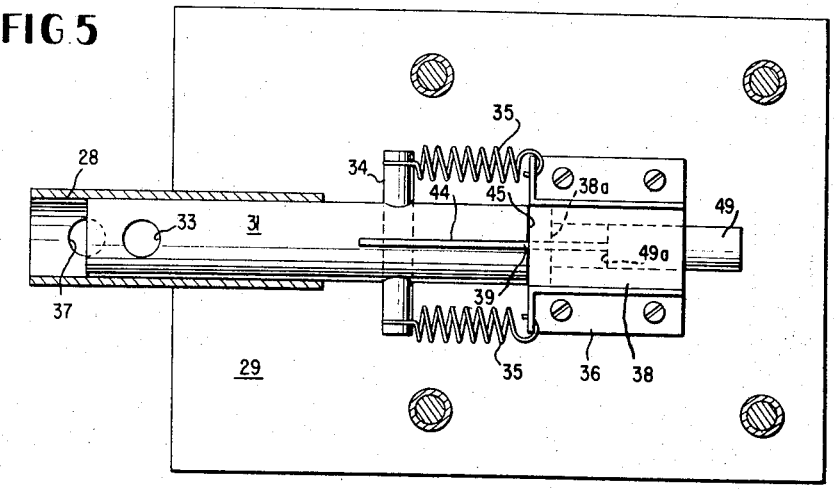

As best seen in FIG. 5, the rear end of plunger 31 is connected to the movable armature 49 of a solenoid 38 by means of a connecting bar 39 which fits into a vertical slot 44 cut in the rear end of the plunger 31 and is retained within the slot by a horizontal pin 34 which projects horizontally through the midline of the rear portion of the plunger 31. The ends of the pin 34 extend beyond the plunger and a spring 35 connects between each pin 34 and the forward portion of solenoid mounting channels 36 on either side of the solenoid to provide spring bias for the plunger operation. The solenoid 38 is mounted to the support frame 29 rearwardly of the dispenser block 28 by the channels 36 to place the armature 49 in line with the plunger 31 and is wound so as to push the armature 49 toward the dispensing block when the solenoid becomes energized. The plunger 31 is axially positioned to have its rear face 45 contact the forward face of the solenoid 38 when the hole 33 in the plunger is aligned below the upper passage 32 leading to the storage bin 27, i.e., the plunger is in the loading position. In this position material from the bin 27 flows downwardly through the upper vertical passage 32 to fill the space of the hole 33 in the plunger. The bias of the springs 35 holds the plunger 31 in the loading position, as illustrated in FIG. 3, except when the solenoid 38 is energized to push the armature 49 and plunger 31 forward against the spring bias.

Figure 6:
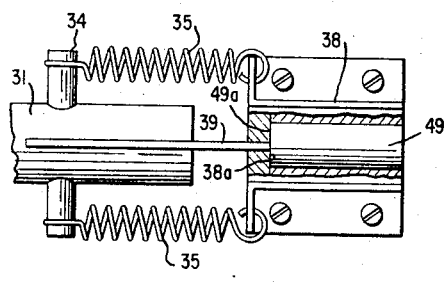
FIG. 6 is a partial horizontal section similar to FIG. 5 with the dispensing plunger in the discharge position.

When the solenoid is energized the armature 49 is forced forwardly into the solenoid, until the front face 49a of the armature contacts the internal forward face 38a of the solenoid chamber, as illustrated in FIG. 6. The distance between the front face 49a of the armature, when the solenoid is unenergized and the rear face 45 of the plunger is in contact with the front face of the solenoid, and the forward face 38a of the solenoid chamber is equal to the horizontal spacing between the upper vertical passage 32 and the lower vertical passage 37 in the dispenser block. Therefore, when the solenoid is energized the plunger 31 is moved forward to align the hole 33 in the plunger with the lower vertical passage 37 in the dispenser block whereby material loaded into the hole 33 falls through the lower passage 37.

A pair of perpendicularly arranged deflector wires 48 on the underside of the dispenser block 28 are positioned to be spaced below the lower end of the opening 37 such that material falling through the passage 37 will strike the deflector wires 38 and become scattered. The cruciform arrangement of the deflector wires illustrated in FIGS. 3 and 4 is but one possible arrangement. Various arrangements of one or more wires or other baffle devices will cause the particles to fall into different patterns as they fall. The particular arrangement of the deflectors must be accommodated to the type of pattern into which the falling particles must be scattered in accordance with the particular decoration being applied.

The lines 40 which supply power to the solenoid 38 are either connected in series with the lines 41 which energize the cutter operating solenoid 25 or the power source for these two units is connected in an equivalent manner such that the solenoid 38 is energized in a specifically timed relation to the operation of the cutters, with or without time delay circuits, etc.

It should be noted that those portions of the dispensing unit 26 having contact with edible material are designed as straight passages with no internal dead ends or pockets which would be difficult to clean. The storage bin 27 and the plunger 31 upon being removed from the dispenser block 28 may be readily cleaned inasmuch as all surfaces are easily contacted with scrubbing brushes. Likewise all internal passages within the dispensing block 28 are readily cleaned by passing brushes through the passages when the storage bin 27, the plunger 31 are dismounted. The dispenser block 28 is made of plastic or metal not affected by food or its acids and is preferably made in one piece (a unitary block). The plunger 31 is preferably made of nylon or other plastic which is impervious to food and has excellent wearing or bearing qualities so that lubrication is not necessary. The manner of pinning the plunger 31 to the connecting bar 39 with the pins 34, makes disassembly of the food containing portions of the dispenser easy for cleaning.

Reverting to FIG. 1, the conveyer belt 11 passes into a refrigeration unit schematically indicated at 47 after leaving the vicinity of the dispensing unit. The purpose of the refrigeration 47 is to freeze the bars on the conveyor belt into a hard frozen confection for subsequent packaging.

To operate the dispenser, the storage bin 27 is filled with whatever particles of edible matter are to be dispensed. The particles from the storage bin will fill the vertical passage 32 of the dispenser block and the aligned hole 33 within the plunger 31. When the solenoid 38 is energized, the plunger 31 is moved forwardly against the action of the spring 35 bringing the hole 33 in the piston into alignment over the lower passage 37 extending downwardly through the bottom of the dispenser block 28. The volume of particles contained within the hole 33 falls through the passage 37 and drops vertically onto the frozen confection 12 which will be directly in the path of the falling particles. The particles striking the deflector wires 38 are scattered into a pattern so as to be substantially evenly distributed over the particular top surface area of the confection 12 which is desired to be covered. By utilizing the proper number of deflector wires 38 or equivalent baffle plates arranged in a specific relationship and adjusting the vertical height of the dispensing unit 26 above the conveyor belt 11, which can be determined by trial and error, the density and area covered by the particles from the dispenser unit may be controlled.

Now considering the method by which decorated frozen confections are produced in accordance with this invention, reference should first be made to FIGS. 1 and 2. A mix of frozen dessert, which is cooled to the degree for it to be plastic but still sufficiently viscous to retain its shape for limited periods of time, is forced under pressure continuously into the inner and outer chamber 17 and 15 through the feed tubes 19, 20 and 21. As previously noted, the source of confection to the feed tubes for the inner and outer extrusion nozzle chambers is different. A frozen mix (soft ice-cream) from the outer chamber feed tubes 19 and 20 is forced downwardly into all corners of the outer chamber 15 by the converging shape of the nozzle so that the plastic mix continuously issuing from the open bottom 16 of the extruder nozzle conforms to the outline of the open bottom end 16 of the nozzle. Another frozen mix, usually of a different color is simultaneously fed under pressure into the inner chamber 17 to emerge through the bottom 18 of the inner chamber. The frozen mixture is fed continuously to the inner and outer chambers 17 and 15 at the same rate so that the inner mix 43 merges with the outer mix 42 to form a solid extruded length within the throat area at the bottom of the nozzle. This extrusion has a central core 43, which conforms to the cross-sectional shape of the exit area 18 of the inner chamber, contained within an outer mass 42 conforming to the shape of the lower portion of the outer chamber 15. After a sufficiently long segment 46 is extruded below the lower end of the extruder nozzle 10, the solenoid 25 is energized and the cutting wires 23 are moved inwardly across the lower opening 16 of the extruder nozzle to sever the lower end of the extruded length 46 to form a bar 12 which falls vertically onto the conveyor belt 11, whereupon the lower surface of the freshly severed bar 12 is quickly congealed by the low temperature of the conveyor belt 11 and the shape of the bar is maintained. However, the upper surface of the freshly severed bar remains in the semi-soft plastic condition in which it was extruded as it is transported away from the nozzle by the conveyer belt.

The dispensing unit 26 is spaced a sufficient distance from the extruder nozzle such that a freshly severed bar is brought to a position below the lower passage 37 in the dispensing block each time the dispensing solenoid is energized in a timed relation to each actuation of the cutter wires 23. For example, in FIG. 1 the speed of the conveyor belt 11, the spacing of the dispensing unit and the rate of extrusion of mix from the extruder nozzle is such that a freshly severed confection 12a lies beneath the dispensing unit 26 at the time that the cutters 23 are actuated to sever the lower end of the extrusion 46 to form another bar of confection, in this case the timed relation between energization of solenoids 25 and 38 being a simultaneous one. By making the necessary adjustment between the spacing of the dispensing unit 26 from the extruder, the speed of the conveyer belt 11 and the rate at which frozen mixes are forced out of the extruder, each actuation of the cutter 22 will trigger the dispensing unit 26 to release a measured amount of particles to fall on exactly the same area of consecutive confections as they pass along the conveyor line. As illustrated in FIG. 1, ice-cream bars having a central inlay in the form of a Christmas tree will have an application of colored candy particles deposited in an evenly distributed pattern over the central tree portion of each confection to simulate a decorated Christmas tree.

Obviously the form of the confection can be varied extensively by modifying the design and shape of the extrusion nozzles. The pattern and density of the particles deposited onto the top of the confection 12 may also be varied by rearranging the configuration of the deflector wires 38 and to some extent, the vertical height of the dispensing unit above the conveyor belt. The top of the confection 12a being soft as it passes beneath the dispensing unit, the particles tend to slightly penetrate into the confection. When the freshly decorated confection 12b passes into the refrigeration unit 47, congealing of the semi-soft top surface of the bar firmly bonds the slightly embedded particles to the bar and produces a final confection with tightly adhering decorative particles.

Although this description has related to the decoration of an uncoated bar, the same basic concept of this invention could be applied to decorating or applying edible matter to the top of a freshly coated bar. In this instance an enrobing or coating apparatus would be incorporated between the extruder assembly 10 and the dispensing unit 26 so that the dessert bar 12 is uniformly coated with an enrobing material, such as chocolate, before it is carried to a position below the dispensing unit. However, the basic principles previously described would apply of actuating the dispenser plunger in a timed relationship to each severing motion of the cutters so that a measured amount of edible matter is deposited on the still soft top surface of successive bars. In this case the top, softened surface would be the outer chocolate layer which has not yet hardened.

While the above matter describes and illustrates preferred embodiments and methods of the invention, it should be understood that the invention is not restricted solely to the described embodiments and methods but that it covers all modifications which would be apparent to one skilled in the art which would fall within the scope and spirit of the invention.

We claim:

1. A method of producing decorated, shaped confections comprising the steps of:
    (a) forcing a mix of confection in a plastic, shape retaining condition through an orifice to form a shaped, extruded length of confection;
    (b) severing a portion from the end of said extruded length to form a shaped bar in a plastically soft, shape retaining condition;
    (c) moving said severed bar away from said orifice in an established path at a predetermined velocity;
    (d) ejecting a measured amount of edible, decorative particles at a point on said path a predetermined distance from said orifice in that timed relation to each step (b) as will place identical areas of successively severed, moving bars in the path of said ejected particles, whereby the particles impinge on and become embedded in preselected areas of the soft surface of each bar; and
    (c) solidifying each decorated bar to a hardened condition, thereby bonding the decorative particles to the surface of the confection.

2. The method as described in claim 1 wherein, in step (a), said confection mix is continuously forced through said orifice to emerge continuously as a shaped, extruded length of confection and in step (b) a portion of said continuously emerging length of mix is periodically severed from the remaining material to form said shaped bar.

3. The method described in claim 2, wherein, in step (d), the measured amount of edible particles is ejected by releasing said measured amount from a point vertically above said established path a predetermined distance from said orifice such hat said particles fall by gravity onto the upper surface of each bar.

4. The method described in claim 2 wherein the lower portion of each severed bar is congealed to a hardened condition by quickly cooling the lower surface of each said bar during step (c), and in step (e) the entire decorated bar is refrigerated to solidify it.

5. The method described in claim 3 wherein said particles released in step (d) are deflected after being released to be scattered over a predetermined area of the upper surface of said bar and the decorated bar is refrigerated in step (e) to solidify it.

6. The method described in claim 5 wherein, in step (a), said confectionary mix comprises a plurality of different confections each continuously forced through a different one of a plurality of contiguous shaped orifices to emerge continuously as a downwardly moving, extruded shaped length of mix having a cross section consisting of separate, contiguous areas of different confection.

7. A method of continuously producing decorated bars of frozen dessert comprising the steps of:
    (a) continuously extruding through a downwardly facing shaped orifice a mix of said dessert cooled to a plastic, shape retaining consistency as a continuously extruded, shaped length;
    (b) periodically severing a portion from the lower end of said extruded length to form a shaped bar in a plastically soft, shape retaining condition by quickly passing a cutting edge transversely through the extruded length adjacent said orifice.
    (c) passing a conveying surface at a predetermined velocity beneath said orifice to catch and transport each said severed bar away from the orifice at a predetermined velocity;
    (d) congealing the lower portion of the severed bar to maintain its shape while retaining the top area in a softened condition by supercooling the conveying surface on which the severed bar rests;
    (c) releasing a measured amount of edible, decorative particles from a point vertically above said established path a predetermined distance from said orifice in that timed relation to each step (b) as will place identical areas of successively severed, moving bars in the freefall path of said released particles, whereby the particles become embedded in preselected areas of the soft top surface of each bar;
    (f) deflecting the released particles to scatter them in an even pattern over the predetermined area of the upper surface of said bars by interposing an arrangement of baffles in the path of fall of said released particles; and
    (g) refrigerating each decorated bar to solidify the entire bar and bond the decorative particles to the final confection.

8. An apparatus for producing decorated, shaped confections comprising, in combination:
    (a) means for supplying under pressure confectionary mix in a plastic, shape retaining condition;
    (b) an extruder nozzle communicating with said supply means having a downwardly facing open end;
    (c) a cutter movable transversely across said open nozzle in close proximity thereto;
    (d) means for moving said cutter across said nozzle end;
    (e) a supercooled, horizontally movable, conveying surface spaced vertically below said nozzle;
    (f) means for moving said conveying surface away from said nozzle at a predetermined velocity;
    (g) means for isolating a fixed amount of edible, decorative particles at a point vertically above said conveying surface at a predetermined distance from said nozzle; and
    (h) means for releasing the isolated particles in a timed relation to the movement of said cutter.

References Cited
UNITED STATES PATENTS

| | | | |
|---|---|---|---|
| 1,786,108 | 12/1930 | Drury | 107—1 |
| 3,036,533 | 5/1962 | Burt et al. | 107—54 |
| 3,196,809 | 7/1965 | Nelson et al. | 107—1 |

WALTER A. SCHEEL, *Primary Examiner.*

J. SHEA, *Assistant Examiner.*